C. C. GLASS.
FISH SPEAR.
APPLICATION FILED NOV. 27, 1918.
1,297,344.
Patented Mar. 18, 1919.
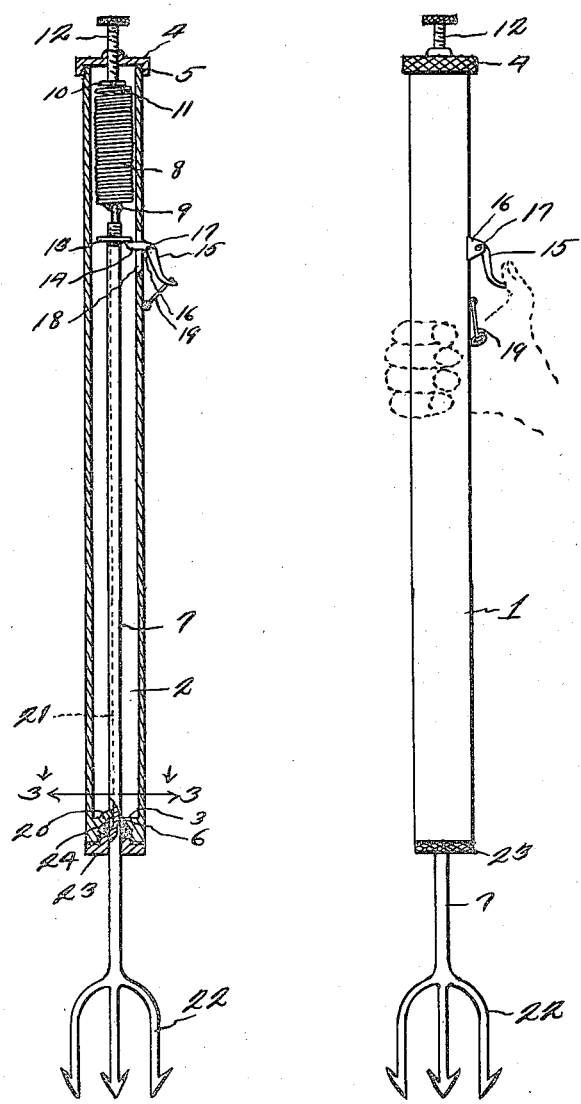
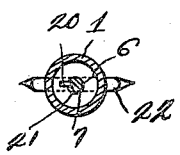
Witnesses
Inventor
C. C. Glass

UNITED STATES PATENT OFFICE.

CHRISTOPHER C. GLASS, OF BESSEMER, ALABAMA.

FISH-SPEAR.

1,297,344.  Specification of Letters Patent.  Patented Mar. 18, 1919.

Application filed November 27, 1918. Serial No. 264,374.

*To all whom it may concern:*

Be it known that I, CHRISTOPHER C. GLASS, a citizen of the United States, residing at Bessemer, in the county of Jefferson, State of Alabama, have invented a new and useful Fish-Spear; and I do hereby declare the following to be a full, clear, and exact description of the invention, such as will enable others skilled in the art to which it appertains to make and use the same.

The invention relates to fish spears and has for its object to provide a spear of this character, wherein the necessity of plunging the spear into the water, thereby causing a shadow on the surface of the water, which as a rule frightens the fish and consequently makes the spearing of the fish difficult.

A further object of the invention is to provide a spring actuated fishing spear, which is controlled by a spring and trigger and also provide means, whereby the spearing member will be guided in its downward movement so that the spearing prongs will not turn, thereby increasing the aim and insuring the entering of the prongs in the position the prongs were in at the time of aiming at the fish.

With the above and other objects in view, the invention consists in the combination and arrangement of the parts, as hereinafter set forth, it being understood that changes in the precise embodiment of the invention may be made, within the scope of what is claimed without departing from the spirit of the invention.

Figure 1 is a side elevation of the fishing spear, showing the same in position for spearing.

Fig. 2 is a vertical sectional view through the spear, showing the same in cocked position.

Fig. 3 is a sectional view on line 3—3 of Fig. 2.

In the drawings the numeral 1 designates a tubular casing, which forms a handle member to be grasped by the operator of the spear. The chamber 2 of the casing is closed at the bottom as at 3 and its upper end is closed by a cap 4, which is threaded on the upper end of the casing 1 as at 5.

Slidably mounted in the aperture 6 of the bottom 3 is spearing rod 7, said spearing rod being adapted to be forced downwardly by the coiled spring 8, one end of which is secured to the upper end of the spearing rod as at 9, its other end being secured to a pivoted plate 10 as at 11. The plate 10 being pivotally mounted on a set or adjusting screw 12, which is threaded in the cap 4. By means of the adjusting screw 12 the tension of the spring may be changed, thereby increasing the rapidity of the spearing operation if desired. A trigger engaging member 13 is threaded upon the spearing rod 7, which when the spear is in cocked position is adapted to be engaged by the end 14 of a trigger 15. The trigger is mounted between ears 16 by means of a pin 17, the end 14 extending through an aperture 18. It will be noted that the spearing rod may be released by a movement of the end 14 of the trigger in either direction. A looped member 19 is provided to hold the trigger in cocked position when desired.

The bottom 3 is provided with a lug 20 which slidably engages a slot 21 in the spearing rod, thereby guiding the spearing rod during a spearing operation and insuring the impalement of the fish by the impaling members 22 in the position in which they were when the spearing rod was released.

A bushing 23 is threaded in the lower end of the member 1 thereby forming tightening means for a packing 24. The object of this packing being to prevent entrance of water into the chamber 2.

The invention having been set forth, what is claimed as new and useful is:—

A fish spear comprising a body member, a spring actuated spearing rod slidably mounted and guided therein, adjusting means whereby the speed of the spearing rod may be increased or diminished, a trigger engaging the upper end of the spearing rod whereby the spearing rod may be locked and released as desired and a packing at the bottom of the body member whereby water is prevented from entering the same.

In testimony whereof I have signed my name to this specification in the presence of two subscribing witnesses.

CHRISTOPHER C. GLASS.

Witnesses:
J. D. RUFFIN,
C. E. RUFFIN.